United States Patent
Shi

(10) Patent No.: US 12,096,750 B2
(45) Date of Patent: Sep. 24, 2024

(54) SWITCHING STRUCTURE FOR PET PULLING PIECE

(71) Applicant: JINHUA SOLID TOOLS CO., LTD., Jinhua (CN)

(72) Inventor: Fuyou Shi, Jinhua (CN)

(73) Assignee: JINHUA SOLID TOOLS CO., LTD., Jinhua (CN)

( * ) Notice: Subject to any disclaimer, the term of this patent is extended or adjusted under 35 U.S.C. 154(b) by 398 days.

(21) Appl. No.: 17/741,452

(22) Filed: May 11, 2022

(65) Prior Publication Data
US 2023/0276772 A1     Sep. 7, 2023

(30) Foreign Application Priority Data
Mar. 6, 2022   (CN) .......................... 202210216710.2

(51) Int. Cl.
*A01K 27/00*     (2006.01)
(52) U.S. Cl.
CPC ................................ *A01K 27/004* (2013.01)

(58) Field of Classification Search
CPC . A01K 27/003; A01K 27/004; B65H 75/4442
See application file for complete search history.

(56) References Cited

U.S. PATENT DOCUMENTS

| 10,420,327 | B2 * | 9/2019 | Zhu | ...................... | A01K 27/004 |
| 10,829,341 | B2 * | 11/2020 | Lai | ...................... | B65H 75/4431 |
| 11,445,705 | B2 * | 9/2022 | Chung | ............... | B65H 75/4442 |

* cited by examiner

*Primary Examiner* — Sang K Kim

(57) ABSTRACT

Disclosed is a switching structure for pet pulling piece. The switching structure includes a shell, a string roller is provided inside the shell, a pulling belt is coiled with the string roller, a plurality of protruding stop portions are provided on the string roller in a circle, a switch locking structure is provided on the shell, the string roller is locked through the switch locking structure; an elastic switch structure used in the disclosure is more comfortable in hand when used, can be locked by a pressing down and pulling action, can be unlocked by pushing forward a small switch, and has a more convenient operation.

6 Claims, 3 Drawing Sheets

SWITCHING STRUCTURE FOR PET PULLING PIECE

CROSS REFERENCE OF RELATED APPLICATIONS

The present application claims priority of Chinese Patent Application No. 202210216710.2, filed on Mar. 6, 2022, the entire contents of which are hereby incorporated by reference.

TECHNICAL FIELD

The disclosure relates to a pet pulling piece, and in particular to a switching structure for a pet pulling piece.

BACKGROUND

At present, the pulling piece for pet generally includes a pet pulling piece mainframe and a pulling rope. The pulling rope is connected with a string roller in the pet pulling piece mainframe. Generally, a locking structure is provided to get a desired releasing length, the locking structure prevents the string roller from continuing to release the string, such that the pulling rope maintains a constant length. However, the current locking structure is very inconvenient in operation, and has complex structure, short service life and bad locking effect.

SUMMARY

The technical problem to be solved in the disclosure is a switching structure for pet pulling piece, an elastic switch structure is used, is more comfortable in hand when used, can be locked by a pressing down and pulling action, can be unlocked by pushing forward a small switch, and has a more convenient operation.

The present disclosure is implemented through the following technical solution: a switching structure for pet pulling piece comprising a shell, a string roller provided inside the shell, a pulling belt coiled with the string roller, a plurality of protruding stop portions provided on the string roller in a circle, a switch locking structure provided on the shell, and the string roller lockable through the switch locking structure;
  wherein, the switch locking structure comprises a big switch and a small switch, the big switch is mounted in the shell, the small switch is slidably mounted on the big switch, one end of the big switch extends towards the string roller and forms a big switch shaft, the big switch shaft is rotationally mounted on the shell, an other end of the big switch shaft is a free end, a locking block is rotationally provided on the shell under a bottom of the big switch, the locking block is rotatable by pressing the free end of the big switch, the rotated locking block abuts against one protruding stop portion on the string roller to lock the string roller;
  wherein an elastic reset mechanism is arranged under the bottom of the big switch shaft, when the locking block is rotated to lock the string roller, the elastic reset mechanism is in a compressed state; and
  wherein a switch locking column is provided which extends through the middle of the small switch, two sides of the switch locking column are fixed on the shell, the small switch is lockable by using the switch locking column, to restrain the free end of the big switch from popping up.

In some embodiments, a portion of the big switch at the bottom corresponding to the locking block is provided with a pressing block, the locking block comprises a locking block shaft, a locking portion, a pressing part and a contacting part, the contacting part is arranged on a side of the locking block shaft adjacent to the pressing block, when the pressing block is pressed down and contacts the contacting part, and is pressed down further after in contact with the contacting part, the locking block is rotated, the pressing part is provided on a side towards the elastic reset mechanism, when the locking block is rotated, the pressing part is in contact with the elastic reset mechanism, the locking portion is located on the locking block shaft between the pressing part and the contacting part, one protruding stop portion on the string roller is locked through the locking portion.

In some embodiments, the elastic reset mechanism comprises a slider, a spring and a limiting piece, the limiting piece is fixedly provided inside the shell, one end of the spring is mounted in the limiting piece, an other end of the spring is mounted on the slider, the slider is slidably mounted inside the shell, when the big switch is pressed down to rotate the locking block, the spring is compressed after the pressing part presses one end of the slider.

In some embodiments, each of two sides of the slider is provided with a sliding part, the inside of the shell is provided with a guide chute, the slider is slidably mounted within the guide chute through the sliding part, a mounting column is provided on the slider and is used for mounting a spring.

In some embodiments, a bottom of the small switch is provided with a catch, a middle of the catch is provided with a locking hole for the switch locking column extending through, a locking groove is provided inside the locking hole, the locking groove and the lock hole form an L shape, after the big switch is pressed down, the small switch is pushed away from the locking block to restrain the free end of the big switch from popping up, at that time the switch locking column is located in the locking groove.

In some embodiments, the big switch is provided with a switching chute passing therethrough, the small switch and the catch at the bottom of the small switch pass through the switching chute and extend into to the shell, two sides of the catch located at a bottom of the switching chute are provided with a limiting block restraining the small switch from being pulled outward.

The beneficial effect of the disclosure is that: the disclosure uses an elastic switch structure, which is more comfortable in hand when used, can be locked by a pressing down and pulling action, can be unlocked by pushing forward a small switch, and has a more convenient operation and a simpler structure.

BRIEF DESCRIPTION OF THE DRAWINGS

To more clearly describe the technical solutions in the embodiments of the present disclosure or in the prior art, the accompanying drawings required for describing the embodiments or the prior art are briefly introduced below. Apparently, the accompanying drawings in the following description merely show some embodiments of the present disclosure, and a person of ordinary skill in the art may still derive other drawings from these accompanying drawings without creative efforts.

Figure 1:
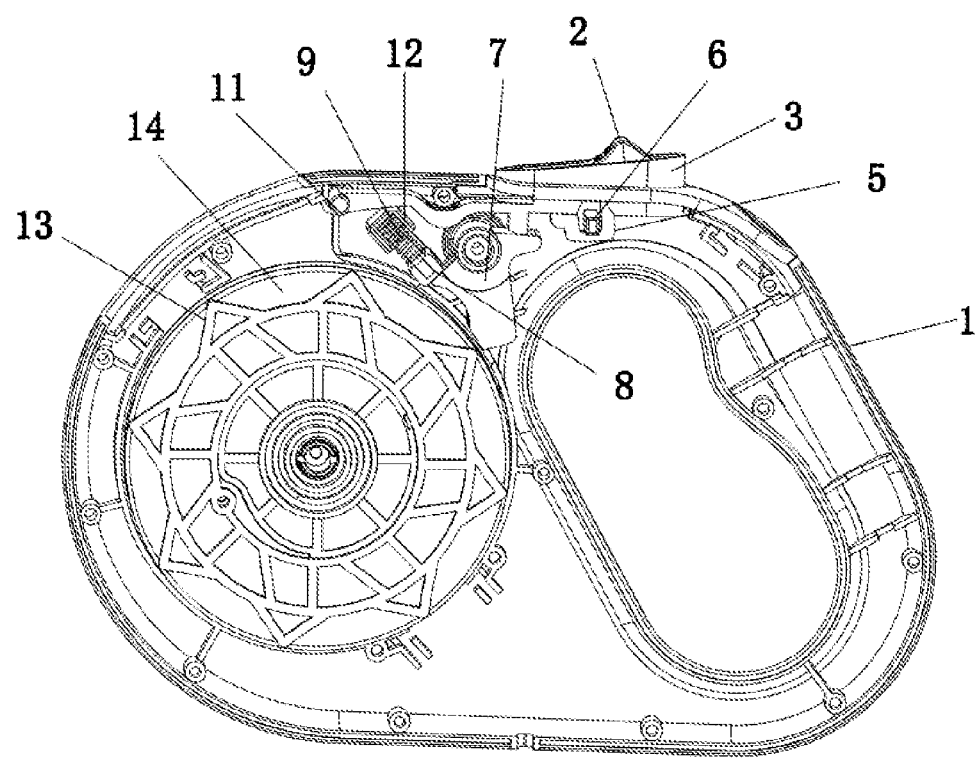
FIG. 1 is a schematic view of the present disclosure in an unlocked state.

Reference numerals: 1, shell; 2, small switch; 3, big switch; 4, locking hole; 5, catch; 6, switch locking column; 7, locking block; 8, slider; 9, spring; 11, big switch shaft; 12, limiting piece; 13, protruding stop portion; 14, string roller; 51, locking groove; 71, locking block shaft; 72, locking portion; 73, pressing part; 74, contacting part; 81, sliding part.

DESCRIPTION OF THE EMBODIMENTS

All features disclosed in the specification, or the steps of all methods or processes disclosed, may be combined in any manner other than mutually exclusive features and/or steps.

Any feature disclosed in this specification (including any accompanying claims, abstract, and drawings) may, unless specifically stated, be replaced by other equivalent or similar alternative features serving the same purpose. That is, unless specifically stated, each feature is only one example of a generic series of equivalent or similar features.

In the description of the disclosure, it need to be understood is that the terms "end", "the other end", "outside", "up", "inside", "level", "coaxial", "center", "end part", "length", and "outer end" indicate location or position relationship based on the location or position relationships shown in the accompanying drawings, only to facilitate the description of this disclosure and simplify the description, other than indicate or imply that those indicated devices or components must have a particular orientation or must be constructed and operated in a particular orientation. Therefore, it cannot be understood as a limitation of the disclosure.

Furthermore, in the description of the disclosure, "a plurality of" means at least two, e.g., two, three, etc., unless specifically indicated otherwise.

Terms used in the present disclosure to represent relative positions in space, such as "upper", "above", "below", "lower" and the like are used for ease of description to describe one element or feature's relationship to another element(s) or feature(s) as illustrated in the figures. The spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the term "under" can encompass both an orientation of over and under. The device may be oriented in other ways (rotated 90 degrees or at other orientations) and the spatially relative descriptors used in this specification are interpreted accordingly.

In the present disclosure, otherwise expressly specified and qualified, the terms "provided", "muff-coupling", "connect", "pass through", "plug", etc. shall be understood broadly, for example, may be understood as fixed connection, detachable connection, or integrated; mechanical connection or electrical connection; direct connection or indirect connection through an intermediary, and communication or interconnections between two elements, unless otherwise expressly qualified. The person of ordinary skill in the art may understand the specific meanings of the above terms in the present disclosure according to the specific circumstances.

Figure 2:
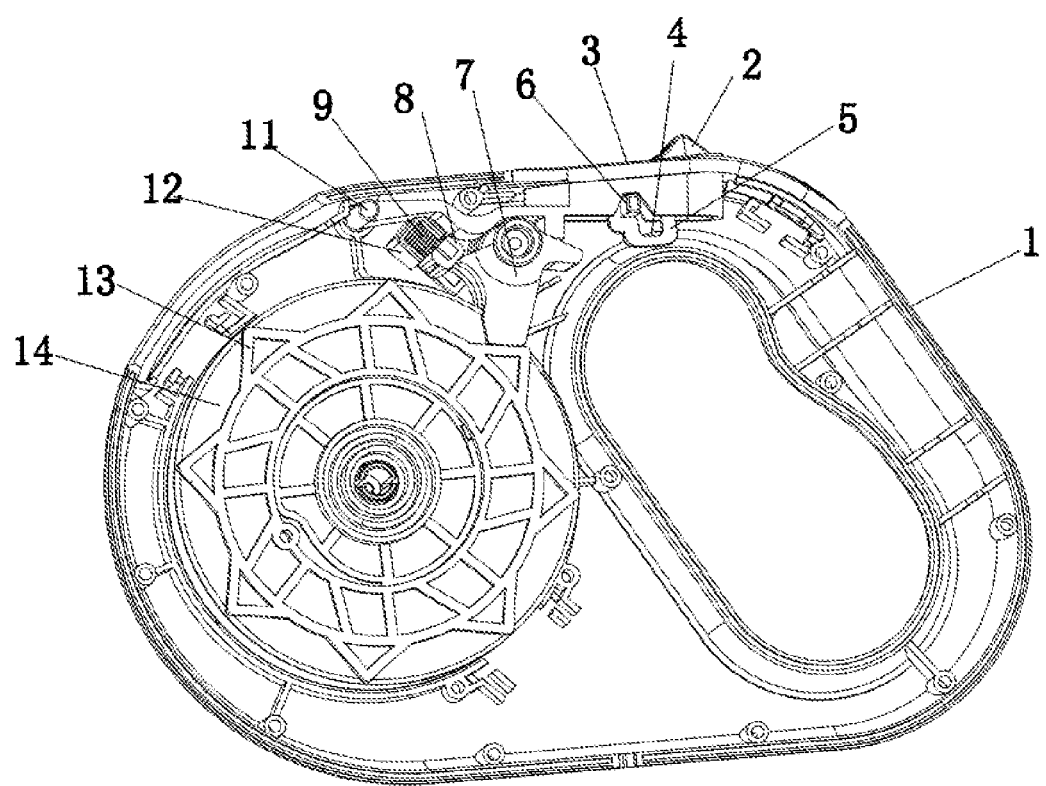
FIG. 2 is a structural schematic view of the disclosure in a lock state.
Figure 3:
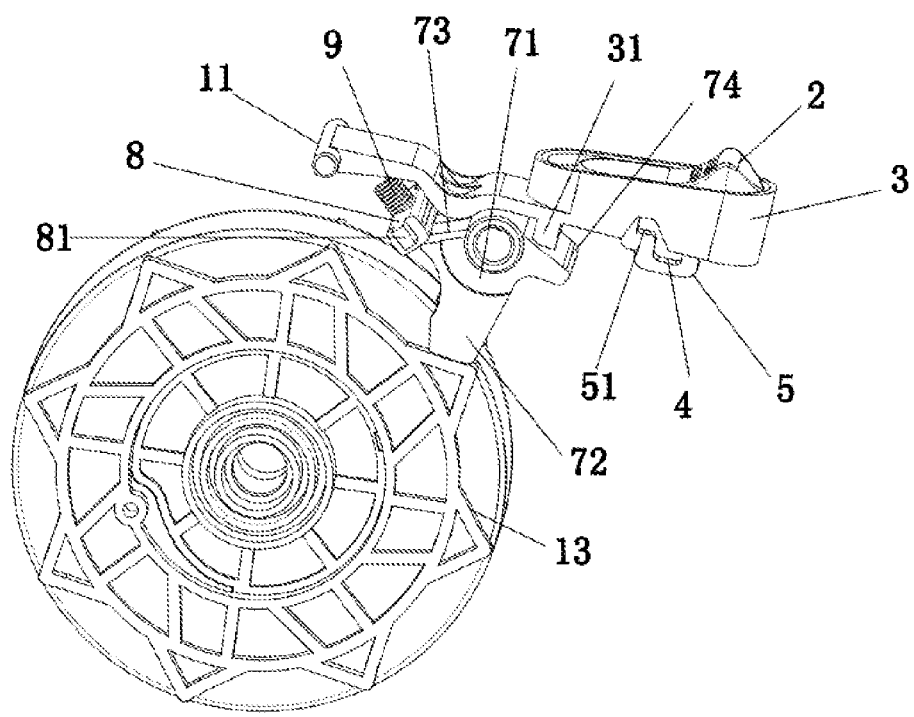
FIG. 3 is a structural schematic view of a switch structure part of the present disclosure.

As shown in FIG. 1 to FIG. 3, a switching structure for a pet pulling piece of the present disclosure includes a shell 1, a string roller 14 provided inside the shell 1, a pulling belt coiled with the string roller 14, a plurality of protruding stop portions 13 provided on the string roller 14 in a circle, a switch locking structure provided on the shell 1, and the string roller 14 lockable through the switch locking structure.

The switch locking structure comprises a big switch 3 and a small switch 2, the big switch 3 is mounted in the shell 1, the small switch 2 is slidably mounted on the big switch 3, one end of the big switch 3 extends towards the string roller 14 and forms a big switch shaft 11, the big switch shaft 11 is rotationally mounted on the shell 1, an other end of the big switch shaft 11 is a free end, a locking block 7 is rotationally provided on the shell 1 under the bottom of the big switch 3, the locking block 7 is rotated by pressing the free end of the big switch 3, the rotated locking block 7 abuts against the protruding stop portion 13 on the string roller 14 to lock the string roller 14.

An elastic reset mechanism is arranged under the bottom of the big switch shaft 11, when the locking block 7 is rotated to locks the string roller 14, the elastic reset mechanism is in a compressed state.

A switch locking column 6 is provided which extends through the middle of the small switch 2, two sides of the switch locking column 6 are fixed on the shell 1, and the small switch 2 is lockable by using the switch locking column 6, to restrain the free end of the big switch 3 from popping up.

A portion of the big switch 3 at the bottom corresponding to the locking block 7 is provided with a pressing block 31, the locking block 7 comprises a locking block shaft 71, a locking portion 72, a pressing part 73 and a contacting part 74, the contacting part 74 is arranged on a side of the locking block shaft 71 adjacent to the pressing block 31, when the pressing block 31 is pressed down and contacts the contacting part 74, and is pressed down further after in contact with the contacting part 74, the locking block 7 is rotated, the pressing part 73 is provided on a side towards the elastic reset mechanism, when the locking block 7 is rotated, the pressing part 73 is in contact with the elastic reset mechanism, the locking portion 72 is located on the locking block shaft 71 between the pressing part 73 and the contacting part 74, a protruding stop portion 13 on the string roller 14 is locked through the locking portion 72.

In this embodiment, the elastic reset mechanism comprises a slider 8, a spring 9 and a limiting piece 12, the limiting piece 12 is fixedly provided inside the shell 1, one end of the spring 9 is mounted in the limiting piece 12, the other end of the spring 9 is mounted on the slider 8, the slider 8 is slidably mounted inside the shell 1, when the big switch is pressed down to rotate the locking block, the spring 9 is compressed after the pressing part 73 presses one end of the slider 8.

Each of two sides of the slider 8 is provided with a sliding part 81, the inside of the shell 1 is provide with a guide chute, the slider 8 is slidably mounted within the guide chute through the sliding part 81, a mounting column is provided on the slider 8 and is used for mounting a spring, the slider is pushed by the pressing part on the locking block to slide along the guide chute, and then the spring is compressed to produces an elastic rebound.

In this embodiment, a bottom of the small switch 2 is provided with a catch 5, a middle of the catch 5 is provided with a locking hole 4 for the switch locking column extending through, a locking groove 51 is provided inside the locking hole 4, the locking groove 51 and the lock hole 4 form an L shape, after the big switch 3 is pressed down, the small switch 2 is pushed away from the locking block 7 to restrain the free end of the big switch 3 from popping up, at that time the switch locking column 6 is located in the locking groove 51.

The big switch 3 is provided with a switching chute passing through the big switch, the small switch 2 and the catch 5 at the bottom of the small switch pass through the switching chute and extend into to the shell 1, two sides of the catch 5 located at a bottom of the switching chute are provided with a limiting block restraining the small switch 2 from being pulled outward, the small switch may be pushed to slide in the switching chute of the large switch.

The whole working process is that: the big switch and the little switch may be elastically pressed, when the small switch is pressed, the free end at the rear end of the big switch is forced to go downward, is rotated through the big switch shaft in front of the free end, drives the slider to slide along the spring extrusion direction, under the limitation of the limiting piece on the shell, the slider is stopped at the position in FIG. 2, at this time the locking block abuts against the protruding stop portion on the string roller, to prevent the string roller from continuing to move. At this time, the small switch is slid backward and then is released, the locking groove on the small switch presses against the locking column of the shell, to complete a stable locking state.

When in the locking state as shown in FIG. 2, the small switch is pushed forward and the groove of the small switch no longer touches the locking column on the shell. At this time, the spring is in a tight state. Under the action of the elastic force, the slider slides along the forward direction of the spring, drives the locking block to rotate around the shaft, and then lifts the big switch and the small switch, until the locking portion leaves the protruding stop portion. At this time, the switch is reset to the unlocked state as shown in FIG. 1.

The above is only a specific implementation of the disclosure, however, the protection scope of the disclosure is not limited, and any change or replacement thought without creative labor shall be covered within the protection scope of the disclosure. Therefore, the protection scope of the disclosure shall be subject to the protection scope defined in the claims.

What is claimed is:

1. A switching structure for pet pulling piece comprising a shell, a string roller provided inside the shell, a pulling belt coiled with the string roller, a plurality of protruding stop portions provided on the string roller which are arranged in a circle, a switch locking structure provided on the shell, and the string roller being lockable through the switch locking structure;

wherein the switch locking structure comprises a big switch and a small switch, the big switch is mounted in the shell, the small switch is slidably mounted on the big switch, one end of the big switch extends towards the string roller and forms a big switch shaft, the big switch shaft is rotationally mounted on the shell, an other end of the big switch shaft is a free end, a locking block is rotationally provided on the shell under a bottom of the big switch, the locking block is rotatable by pressing the free end of the big switch, the rotated locking block abuts against one of the protruding stop portions on the string roller to lock the string roller;

wherein an elastic reset mechanism is arranged under the bottom of the big switch shaft, when the locking block is rotated to lock the string roller, the elastic reset mechanism is in a compressed state; and wherein a switch locking column is provided which extends through the middle of the small switch, two sides of the switch locking column are fixed on the shell, the small switch is lockable by the switch locking column, to restrain the free end of the big switch from popping up.

2. The switching structure for pet pulling piece according to claim 1, wherein a portion of the big switch at the bottom corresponding to the locking block is provided with a pressing block, the locking block comprises a locking block shaft, a locking portion, a pressing part and a contacting part, the contacting part is arranged on a side of the locking block shaft adjacent to the pressing block, wherein when the pressing block is pressed down and contacts the contacting part, and is pressed down further after in contact with the contacting part, the locking block is rotated, the pressing part is provided on a side towards the elastic reset mechanism, when the locking block is rotated, the pressing part is in contact with the elastic reset mechanism, the locking portion is located on the locking block shaft between the pressing part and the contacting part, one of the protruding stop portions on the string roller is locked through the locking portion.

3. The switching structure for pet pulling piece according to claim 1, wherein the elastic reset mechanism comprises a slider, a spring and a limiting piece, the limiting piece is fixedly provided inside the shell, one end of the spring is mounted in the limiting piece, an other end of the spring is mounted on the slider, the slider is slidably mounted inside the shell, when the big switch is pressed down to rotate the locking block, the spring is compressed after the pressing part presses one end of the slider.

4. The switching structure for pet pulling piece according to claim 3, wherein each of two sides of the slider is provided with a sliding part, the inside of the shell is provided with a guide chute, the slider is slidably mounted within the guide chute through the sliding part, a mounting column is provided on the slider and is used for mounting a spring.

5. The switching structure for pet pulling piece according to claim 1, wherein a bottom of the small switch is provided with a catch, a middle of the catch is provided with a locking hole for the switch locking column extending through, a locking groove is provided inside the locking hole, the locking groove and the lock hole form an L shape, after the big switch is pressed down, the small switch is pushed away from the locking block to restrain the free end of the big switch from popping up, at that time the switch locking column is located in the locking groove.

6. The switching structure for pet pulling piece according to claim 1, wherein the big switch is provided with a switching chute passing therethrough, the small switch and the catch at the bottom of the small switch pass through the switching chute and extend into to the shell, two sides of the catch located at a bottom of the switching chute are provided with a limiting block restraining the small switch from being pulled outward.

* * * * *